(12) United States Patent
Li et al.

(10) Patent No.: US 10,615,588 B2
(45) Date of Patent: Apr. 7, 2020

(54) GROUND FAULT CIRCUIT INTERRUPTER

(71) Applicant: Chengli Li, Suzhou (CN)

(72) Inventors: Chengli Li, Suzhou (CN); Guolan Yue, Suzhou (CN)

(73) Assignee: Chengli Li, Suzhou (CN)

( * ) Notice: Subject to any disclaimer, the term of this patent is extended or adjusted under 35 U.S.C. 154(b) by 319 days.

(21) Appl. No.: 15/819,353

(22) Filed: Nov. 21, 2017

(65) Prior Publication Data

US 2018/0109102 A1     Apr. 19, 2018

Related U.S. Application Data

(63) Continuation-in-part of application No. 15/586,952, filed on May 4, 2017, now Pat. No. 9,871,366, which is a continuation-in-part of application No. 15/209,563, filed on Jul. 13, 2016, now Pat. No. 9,857,448.

(30) Foreign Application Priority Data

Nov. 8, 2017  (CN) .......................... 2017 1 1089746
Nov. 8, 2017  (CN) ...................... 2017 2 1476818 U (51) Int. Cl.
| | | |
|---|---|---|
| *H01H 13/06* | (2006.01) | |
| *H02H 3/16* | (2006.01) | |
| *H01H 9/54* | (2006.01) | |
| *H01H 71/24* | (2006.01) | |
| *H02H 3/33* | (2006.01) | |
| *H01H 83/04* | (2006.01) | |

(Continued)

(52) U.S. Cl.
CPC ................ *H02H 3/16* (2013.01); *H01H 9/54* (2013.01); *H01H 71/24* (2013.01); *H02H 3/335* (2013.01); *H01H 13/06* (2013.01); *H01H 83/04* (2013.01); *H01H 83/144* (2013.01); *H02H 3/105* (2013.01); *H02H 3/338* (2013.01)

(58) Field of Classification Search
USPC ....................................................... 361/42–50
See application file for complete search history.

(56) References Cited

U.S. PATENT DOCUMENTS

| | | | |
|---|---|---|---|
| 5,966,280 A | 10/1999 | Cerminara et al. | |
| 7,149,065 B2 * | 12/2006 | Baldwin ................ | H01H 83/04 361/42 |

(Continued)

*Primary Examiner* — Danny Nguyen
(74) *Attorney, Agent, or Firm* — Chen Yoshimura LLP (57) ABSTRACT

A ground fault circuit interrupter device includes a switch module, a ground fault detection module, a self-testing module and a tripping module. The switch module is coupled between the input and output ends to control the electrical connection between the input and output. The ground fault detection module detects whether a leakage current signal exists at the output end. The self-testing module is coupled to the ground fault detection module and periodically generates a self-test pulse signal which simulates the leakage current signal. The tripping module is coupled to the ground fault detection module and the switch module, to control the movement of the switch module. The device includes at least two tripping drive components, which prevents the device from becoming ineffective when the tripping module malfunctions due to long time use or use under high temperatures. This greatly improves safety of the device.

14 Claims, 6 Drawing Sheets

(51) Int. Cl.
*H01H 83/14* (2006.01)
*H02H 3/10* (2006.01)

(56) References Cited

U.S. PATENT DOCUMENTS

| | | |
|---|---|---|
| 7,692,904 B2 | 4/2010 | Li et al. |
| 7,800,873 B2 | 9/2010 | Batko et al. |
| 9,535,106 B2 | 1/2017 | Li |
| 9,547,047 B2 | 1/2017 | Li et al. |
| 2005/0243484 A1* | 11/2005 | Kim .................. H02H 3/335 361/42 |
| 2012/0119918 A1 | 5/2012 | Williams |
| 2014/0117995 A1 | 5/2014 | Topucharla |
| 2014/0278157 A1* | 9/2014 | Simonin ............. H02H 1/0007 702/58 |
| 2015/0070801 A1* | 3/2015 | Endozo .................. H01H 73/00 361/2 |
| 2017/0222425 A1 | 8/2017 | Li et al. |

* cited by examiner

GROUND FAULT CIRCUIT INTERRUPTER

BACKGROUND OF THE INVENTION

Field of the Invention

This invention relates to household appliances, and in particular, it relates to a ground fault circuit interrupter.

Description of Related Art

With the wide use of home appliances, the safety of the appliances becomes more and more important. Currently, ground fault circuit interrupters are installed at the output end of power outlets from the grid or the input end of some appliances, which improves the safety of the appliances. However, in practice, due to long time use or other factors, some problems still remain due to certain shortcomings in the structures of current ground fault circuit interrupters, even when users use the self-testing function of the ground fault circuit interrupters. For example, sometimes, when the ground fault circuit interrupter device detects a current leakage, it cannot timely disconnect the power source because of a malfunction in the internal drive structure. Thus, the ground fault circuit interrupter is still prone to losing its leakage current protection function during use, which may cause dangerous situations. Further, current ground fault circuit interrupters that have self-testing functions can only alert the user of the malfunction using indicator lights or audible signals; for users who cannot recognize a malfunction in the device based on the indicator lights or audible signals, the current ground fault circuit interrupters cannot provide sufficient protection and so there are still safety threats.

Thus, there is a need for a ground fault circuit interrupter that is easy to install and low in cost and that has self-testing functions and redundant protection functions.

SUMMARY

Accordingly, the present invention provides a ground fault circuit interrupter that has redundant protection functions with improved safety and reliability.

The present invention provides a ground fault circuit interrupter which includes: a switch module, a ground fault detection module, a self-testing module, and a tripping module. The switch module is coupled between an input end and an output end to control electrical connection between the input end and the output end. The ground fault detection module detects whether a leakage current signal exists at the output end. The self-testing module is coupled to the ground fault detection module and periodically generates a self-test pulse signal which simulates the leakage current signal. The tripping module is coupled to the ground fault detection module and the switch module, wherein the tripping module includes at least two tripping drive components, each tripping drive component being configured to control the switch module to electrically disconnect the output end from the input end based on the leakage current signal detected by the ground fault detection module.

In one embodiment, the at least two tripping drive components are connected in parallel, wherein each tripping drive component includes a semiconductor device coupled to the ground fault detection module and a tripping coil coupled to the semiconductor device; and wherein when the ground fault detection module detects the leakage current signal, the ground fault detection module causes the semiconductor device of at least one of the tripping drive components to become conductive to control the corresponding tripping coil, wherein the tripping coil in turn drives the switch module to electrically disconnect the output end from the input end.

In one embodiment, the tripping module includes a tripping mechanism and at least two semiconductor devices. Two tripping coils are disposed on the tripping mechanism. Each of the at least two semiconductor devices is coupled to the two tripping coils, and each semiconductor device is further coupled to the ground fault detection module, so that each semiconductor device and each tripping coil form a tripping drive component. When the ground fault detection module detects the leakage current signal, the ground fault detection module causes at least one of the semiconductor devices to become conductive to drive the switch module to electrically disconnect the output end from the input end.

In one embodiment, each semiconductor device includes any one of a silicon controlled rectifier, a MOSFET (metal oxide semiconductor field effect transistors), and a transistor.

In one embodiment, the ground fault detection module includes a periodic timing circuit and a self-test pulse signal circuit coupled to each other, wherein the periodic timing circuit controls a timing interval of generation of the self-test pulse signal by the self-test pulse signal circuit.

In one embodiment, the self-test pulse signal circuit includes a switch device and a shunt reference coupled to the switch device, wherein the periodic timing circuit is coupled to the shunt reference to control the switch device to generate the self-test pulse signal.

In one embodiment, the self-test pulse signal circuit includes a switch device and a comparator coupled to the switch device, wherein the periodic timing circuit is coupled to the comparator to control the switch device to generate the self-test pulse signal.

In one embodiment, the ground fault detection module further includes a power supply module for supplying power to the self-test pulse signal circuit and/or the periodic timing circuit. When the power supply module only supplies power to the self-test pulse signal circuit, the ground fault detection module also includes a pulse source for periodic timing which is coupled to a power line of the ground fault circuit interrupter to obtain power to supply power to the periodic timing circuit.

In one embodiment, the ground fault detection module includes: a leakage current detection ring and a leakage current detection unit. The leakage current detection ring detects whether a leakage current signal exists between a phase line and a neutral line at the output end. The leakage current detection unit is coupled to the leakage current detection ring and to the tripping module. When the leakage current detection unit detects a leakage current signal via the leakage current detection ring, it controls the tripping module to drive the switch module to electrically disconnect the output end from the input end.

The ground fault circuit interrupter according to embodiments of this invention is provided with a tripping module that includes at least two tripping drive components, and a self-testing module. It can periodically self-test the leakage current protection function during use and provide corresponding alert to the user. Further, when a malfunction of the device is detected during operation, for example when one tripping drive component malfunctions and becomes ineffective, the other tripping drive component can still function normally to timely disconnect the output from the power input. This can ensure the proper function of the ground fault circuit interrupter and greatly improve the safety and reliability of the electrical circuit.

BRIEF DESCRIPTION OF THE DRAWINGS

The following drawings are used to describe the embodiments. These drawings explain the principles of the inven

DETAILED DESCRIPTION OF PREFERRED EMBODIMENTS

Embodiments of the invention are described below with reference to the drawings. The drawings illustrate specific embodiment that can achieve the goals of the present invention. The illustrated embodiments are not intended to show all possible embodiments of the invention. It should be understood that other embodiments can be constructed without departing from the spirit of the invention, and the illustrated embodiments may be modified structurally or logically. Thus, the detailed descriptions below are limiting, and the scope of the invention should be determined by the appended claims.

Embodiments of the present invention provide a ground fault circuit interrupter, which can perform self-testing during use; moreover, when any one tripping drive component of the its tripping mechanism malfunctions, the ground fault circuit interrupter can still function properly. Based on the above design, a ground fault circuit interrupter according to embodiments of the present invention includes: a switch module, a ground fault detection module, a self-testing module, and a tripping module. The ground fault detection module detects whether a ground fault is present at the power output end. During use, the self-testing module detects whether the ground fault detection module is functioning normally. When the ground fault detection module detects a ground fault, the tripping module drives the switch module to disconnect the electrical coupling, thereby disconnecting the power source. When any tripping drive components of the tripping module malfunctions, other one or more tripping drive components can still function normally to control the action of the switch module.

Figure 1:
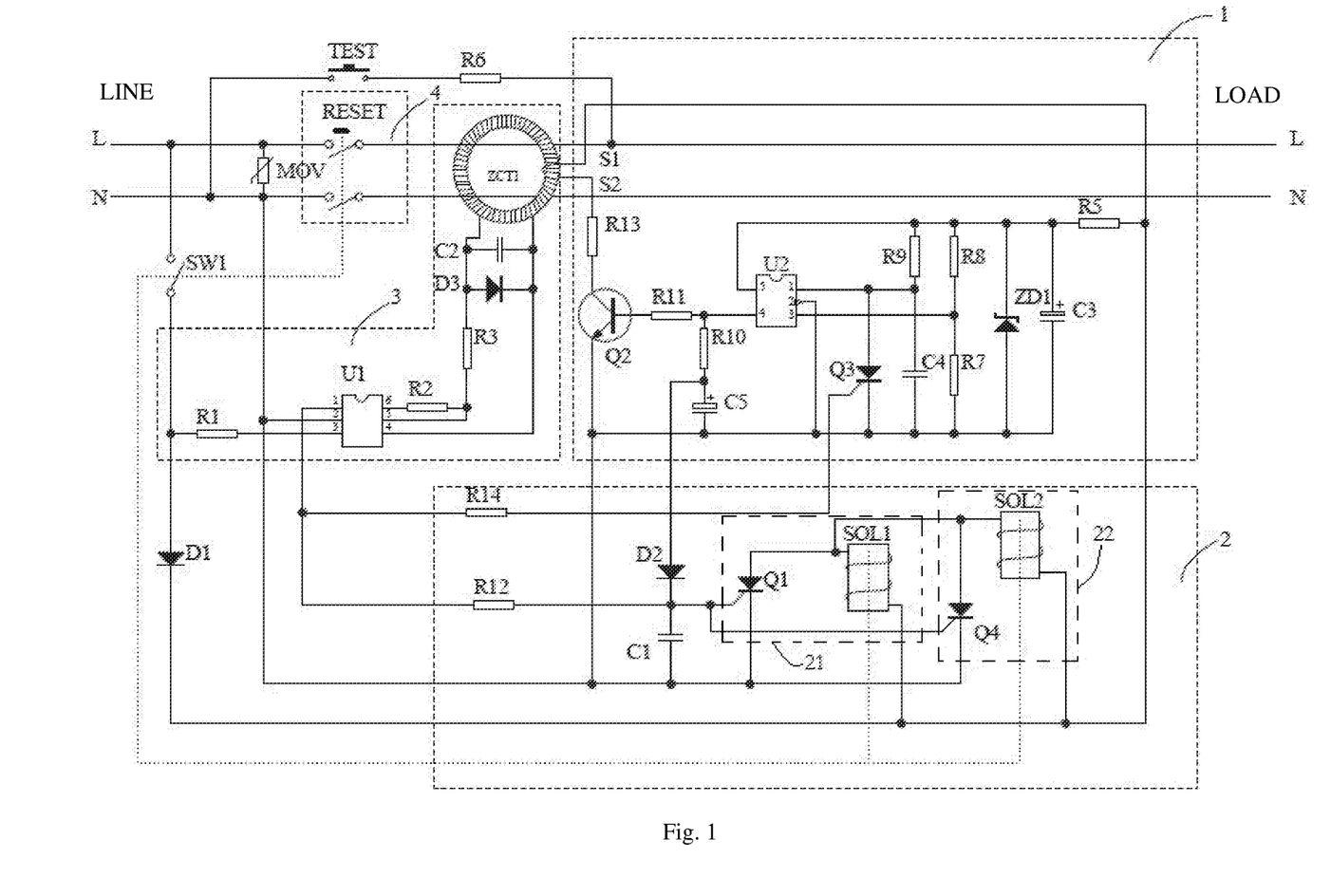
- FIG. 1 is a circuit diagram showing a first embodiment of the present invention.

FIG. 1 is a circuit diagram showing a ground fault circuit interrupter according to the first embodiment of the present invention. As shown in FIG. 1, the ground fault circuit interrupter of the first embodiment includes an input end LINE and an output end LOAD, a switch module 4 which controls the electrical connection between the input end LINE and output end LOAD, a self-testing module 1, a tripping module 2, and a ground fault detection module 3. The ground fault detection module 3 detects whether a leakage current signal is present at the input end LINE and output end LOAD, and more specifically, whether a leakage current signal is present on the phase line L and neutral line N on the output end LOAD. The self-testing module 1 determines whether the ground fault detection module 3 is functioning normally. When the ground fault detection module 3 detects a leakage current signal, it controls the tripping module 2 to drive the switch module 4 to disconnect the electrical connection, thereby disconnecting the power source to protect the appliance.

The operation of the first embodiment of FIG. 1 is described below.

In this embodiment, the ground fault detection module 3 includes a leakage current detection ring ZCT1 that has the phase line L and the neutral line N pass through it, and a leakage current detection unit (including a leakage current detection chip U1 and related electronic components couplet to it) coupled to the leakage current detection ring ZCT1. When there is a current imbalance in the phase line L and the neutral line N passing through the leakage current detection ring ZCT1, i.e., there is a leakage current signal, the leakage current detection ring ZCT1 generates a corresponding voltage signal. The leakage current detection chip U1 detects the voltage signal on the leakage current detection ring ZCT1, and based on it, controls the tripping module 2 to drive the switch module 4 to disconnect the power source.

In this embodiment, the tripping module 2 includes two tripping drive components 21 and 22 connected in parallel. Each tripping drive component includes a semiconductor device (silicon-controlled rectifier (SCR) Q1 or Q4) that is coupled to the ground fault detection module 3 and the self-testing module 1, and a tripping coil (SOL1 or SOL2) that is coupled to the SCR (Q1 or Q4). When the leakage current detection chip U1 detects that the voltage signal generated by the leakage current detection ring ZCT1 reaches a predefined threshold, it controls the SCRs Q1 and Q4 to become conductive. When Q1 and Q4 are conductive, the tripping coils SOL1 and SOL2 experience large currents, which cause the switch module 4 to disconnect the lines. In use, when the SCR Q1 or the tripping coil SOL1 malfunctions (for example, the cathode or anode of the SCR Q1 is open, the tripping coil SOL1 is open, etc.) but the SCR Q4 and the tripping coil SOL2 still function normally, and when the leakage current detection chip U1 detects the voltage signal on the leakage current detection ring ZCT1, the SCR Q4 and the tripping coil SOL2 function normally to drive the switch module 4 to disconnect the power source. The operation is similar when Q4 or SOL2 malfunctions.

In this embodiment, the self-testing module 1 performs a periodic self-testing of the ground fault detection module 3. The self-testing module 1 includes a power supply circuit, a periodic timing circuit and a self-test pulse signal circuit that generates a simulated leakage current signal. Referring to FIG. 1, the power supply circuit includes a resistor R5, a voltage regulator ZD1, and a capacitor C3. The periodic timing circuit includes serial connected resistor R9 and timing component (e.g. capacitor C4), for generating a time interval for the self-test pulse signal. The self-test pulse signal circuit includes a switch device (e.g. transistor Q2), a comparator U2, a diode D2, a capacitor C5, a resistor R10, and resistors R11 and R13 which are respectively coupled to the base and collector of transistor Q2, etc. When the ground fault circuit interrupter is operating, the self-testing module 1 periodically applies to the leakage current detection ring ZCT1 a simulated leakage current signal that reaches the predefined threshold value.

More specifically, resistor R5, voltage regulator ZD1 and capacitor C3 provide a working power for the comparator U2 (at pin 5 of the comparator U2). Resistors R7 and R8 form a voltage divider coupled to the working power to provide a reference voltage for the comparator U2 (at pin 3 of the comparator U2). Capacitor C4 is charged by the working power via resistor R9 to generate a time interval for the self-test pulse signal, which is input to the comparator U2 (at pin 1 of the comparator U2). When the voltage on capacitor C4 rises to the level of the reference voltage, the comparator U2 (at pin 4 of the comparator U2) outputs a signal, which drives transistor Q2 to become conductive, which in turn generates, via resistor R13, a self-test pulse signal on the leakage current detection ring ZCT1.

When the self-testing module 1 detects that the ground fault detection module 3 is malfunctioning, e.g. the leakage current detection chip U1 cannot make transistor Q1 conductive, then capacitor C4 does not have a discharge circuit; as a result, the self-testing module 1 (at pin 4 of the comparator U2) will continue to output a high voltage. Thus, capacitor C5 is charged via resistor R10, and when its voltage reaches the predefined threshold, diode D2 conducts. As a result, SCR Q1 and/or Q4 become conductive, which causes tripping coils SOL1 and/or SOL2 to move, which in turn controls the switch module 4 to disconnect the power. In use, when SCR Q1 or tripping coil SOL1 malfunctions (for example, the cathode and/or anode of the SCR Q1 is open, the tripping coil SOL1 is open, etc.) but SCR Q4 and tripping coil SOL2 still function normally, and when comparator U2 detects a malfunction in the ground fault detection module 3, the comparator U2 can control SCR Q4 to conduct. As a result, tripping coil SOL2 experience a large current and controls the switch module 4 to disconnect the power. The operation is similar when SCR Q4 and/or tripping coil SOL2 malfunctions.

To summarize, in this embodiment, by using the self-testing module 1, the ground fault circuit interrupter can, when it is functioning normally, periodically self-test whether its leakage current protection function is normal. When the ground fault detection module 3 malfunctions, the device controls the tripping module to drive the switch module to disconnect the power source. And/or, when the ground fault detection module 3 detects a leakage current signal, the device controls the tripping module to drive the switch module to disconnect the power source. Further, when any tripping drive component (21 or 22) of the tripping module malfunctions, the normal function of the other tripping drive component (22 or 21) is not affected, so that the ground fault circuit interrupter can disconnect the power source.

In addition to SCRs, MOSFETs (metal oxide semiconductor field effect transistors) and transistors can also be used as the semiconductor device.

Figure 2:
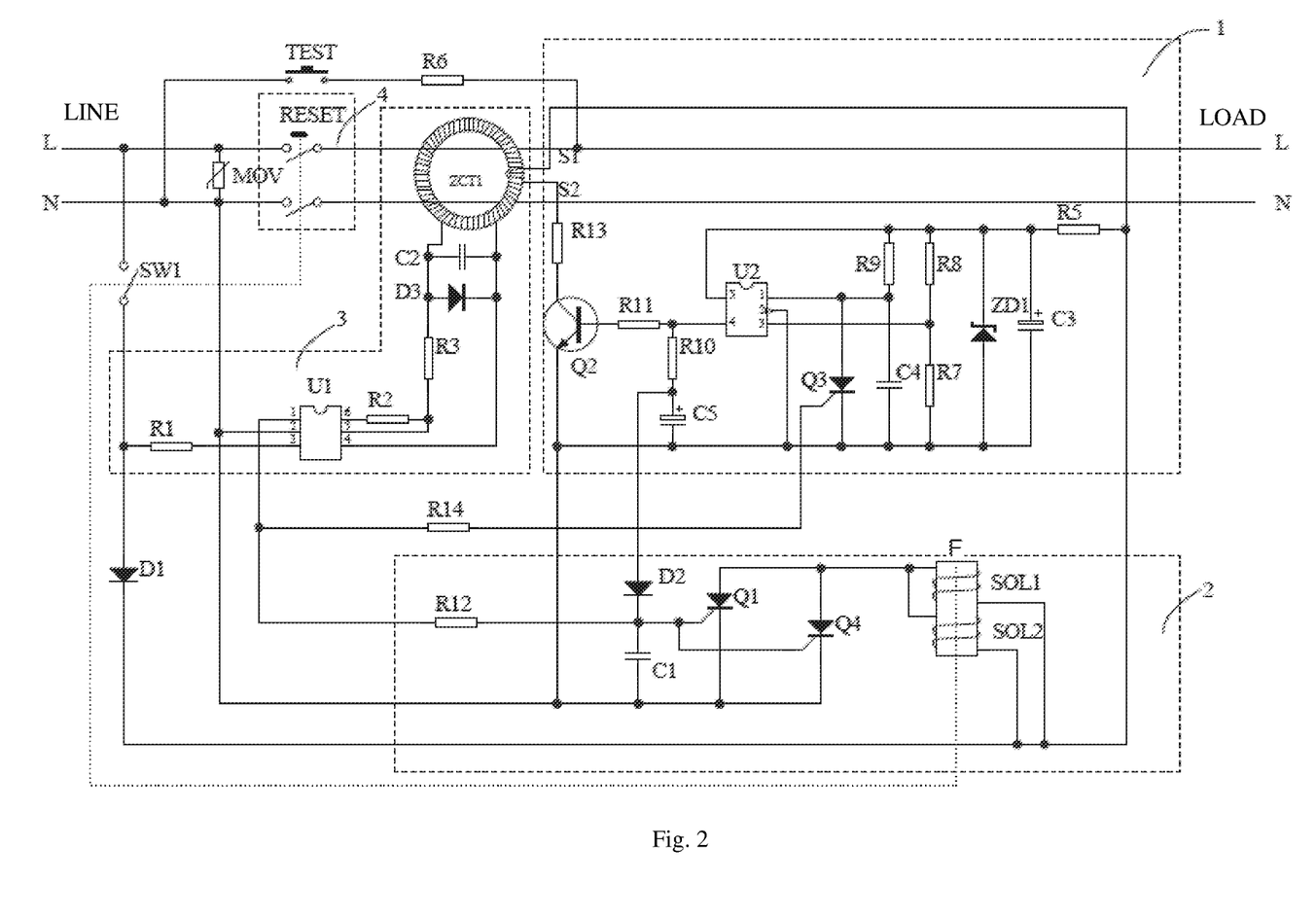
FIG. 2 is a circuit diagram showing a second embodiment of the present invention.

FIG. 2 is a circuit diagram showing the second embodiment of the present invention. Its operation is as follows.

As compared to FIG. 1, the structure of the tripping module 2 in FIG. 2 is modified: Two coils are disposed on the tripping mechanism F, respectively forming tripping coils SOL1 and SOL2. The anode of SCR Q1 is coupled to both of the tripping coils, and the anode of SCR Q4 is also coupled to both of the tripping coils. The control electrode of SCR Q1 and the control electrode of SCR Q4 are both coupled to the ground fault detection module 3 and the tripping module 2. Thus, the combinations of SCR Q1 and tripping coil SOL1, SCR Q1 and tripping coil SOL2, SCR Q4 and tripping coil SOL1, and SCR Q4 and tripping coil SOL2 can respectively form different tripping drive components. Thus, when the ground fault detection module 3 detects a leakage current signal and/or the self-testing module 1 detects a malfunction of the ground fault detection module 3, the SCR Q1 and/or SCR Q4 can be controlled to control tripping coil SOL1 and/or tripping coil SOL2, to in turn drive the switch module 4 to disconnect the electrical connection, thereby disconnecting the power source. Further, when SCR Q1 or Q4 malfunctions, the function of the other SCR Q4 or Q1 is not affected, which can control the tripping coil SOL1 and/or SOL2 to drive the switch module 4 to disconnect the power source. Or, when tripping coil SOL1 or SOL2 malfunctions, the other tripping coil SOL2 or SOL1 can still be controlled by SCR Q1 and/or Q4 to drive the switch module 4 to disconnect the power source. Or, when one of the SCRs Q1 or Q4 malfunctions and one of the tripping coils SOL1 and SOL2 malfunctions, the other normally functioning SCR and tripping coil can cooperate to drive the switch module 4 to disconnect the power source.

Thus, compared to the first embodiment, the tripping module of this embodiment is more flexible and more reliable; when one of the SCRs and/or one of the tripping coils of the tripping module malfunctions, the tripping module can still function properly. This greatly improves the usability, flexibility, reliability and safety of the ground fault circuit interrupter.

Moreover, in the embodiments of FIGS. 1 and 2, when the self-testing module 1 detects a malfunction in the ground fault detection module 3, it can control the tripping module 2 to drive the switch module 4 to disconnect the power source. This allows users to safely use the appliance equipped with the ground fault circuit interrupter even if the users cannot recognize a malfunction in the ground fault circuit interrupter based on indicator lights.

Figure 3:
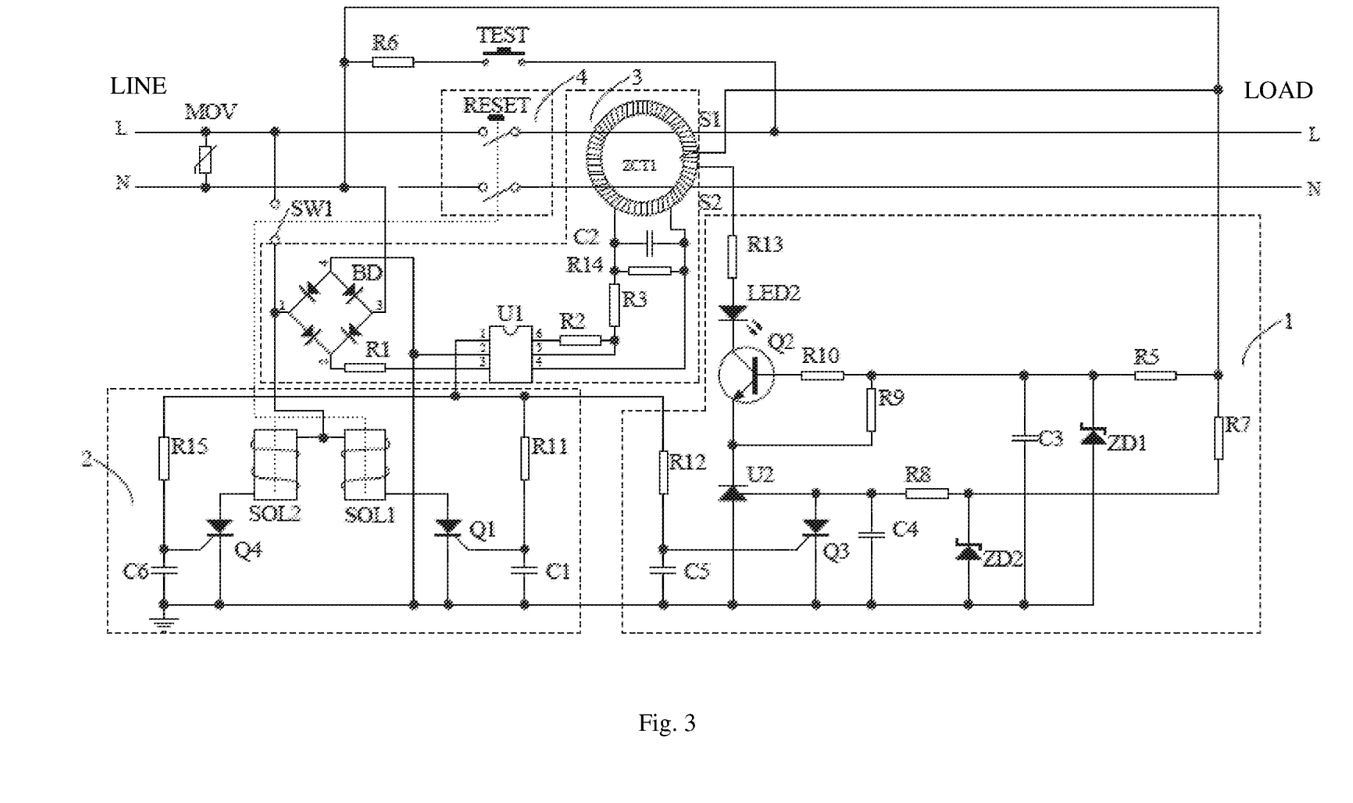
FIG. 3 is a circuit diagram showing a third embodiment of the present invention.

FIG. 3 is a circuit diagram showing a ground fault circuit interrupter according to the third embodiment of the present invention.

As shown in FIG. 3, the self-testing module 1 includes a power supply circuit, a periodic timing circuit, and a self-test pulse signal circuit that generates a simulated leakage current signal. Referring to FIG. 3, the power supply circuit includes a resistor R5, a voltage regulator ZD1, and a capacitor C3. The self-test pulse signal circuit includes a switch device (e.g. transistor Q2), a shunt reference U2, a resistor R12, and a capacitor C5. Different from FIG. 1, here the periodic timing circuit includes serial connected resistor R8 and timing component (e.g. capacitor C4), for generating a time interval for the self-test pulse signal, where resistor R8 is coupled in series with a resistor R7, and where a voltage regulator ZD2 is coupled between ground and the point between resistors R7 and R8. Thus, the voltage at the REF terminal of the shunt reference U2 is limited to below or equal to the regulated voltage level of the voltage regulator ZD2. The power supply circuit provides working power for transistor Q2 and shunt reference U2. Resistor R7 and voltage regulator ZD2 form a pulse source for periodic timing, coupled to the N line to obtain power to supply the periodic timing circuit.

The self-testing module 1 of the third embodiment operates as follows. When the ground fault detection module 3 functions normally, after the ground fault circuit interrupter is reset, the voltage on capacitor C4 is zero, so the voltage at the REF terminal of the shunt reference U2 is lower than the reference voltage 2.5 V. Thus, the internal transistor of the shunt reference U2 is non-conducting, and the shunt reference U2 does not conduct. The pulse source for periodic timing charges capacitor C4 via resistor R8. When the voltage on capacitor C4 is charged to 2.5V or above, the internal transistor of the shunt reference U2 becomes conductive; this causes transistor Q2, which has a positive bias applied to its base, to become conductive. Thus, a self-test pulse signal is generated in the leakage current detection ring ZCT1. The leakage current detection chip U1 detects this self-test pulse signal, and drives SCR Q3 to become conductive; capacitor C4 is then discharged via SCR Q3. More specifically, when the self-test pulse signal is generated, the leakage current detection chip U1 outputs a signal to drive SCRs Q1, Q4 and Q3. This signal, via resistor R12 and capacitor C5, drives SCR Q3 to become conductive, so that capacitor C4 is discharged, thereby starting the next self-test period. At the time SCR Q3 is driven, the self-test pulse signal is turned off; the delay caused by capacitors C1 and C6 causes SCRs Q1 and Q4 to remain non-conductive. As a result, the tripping coils SOL1 and SOL2 cannot form a current loop, so switch module 4 remain closed (connected). If a sustained leakage current signal is detected, the SCR Q3 becomes conductive, so that the self-test pulse signal circuit does not generate a self-test pulse signal; thus SCRs Q1 and Q4 become conductive, causing tripping coils SOL1 and SOL2 to form current loops, which in turn drives switch module 4 to disconnect the power source.

When the ground fault detection module 3 is malfunctioning, when the self-test pulse signal is output, the leakage current detection chip U1 cannot output the drive signal for SCRs Q1, Q3 and Q4; as a result, resistor R12 and capacitor C5 cannot drive SCR Q3 to become conductive, and capacitor C4 cannot discharge via the SCR Q3. Because the voltage across capacitor C4 remains at the high level, the shunt reference U2 remains conductive, so the light emitting diode LED2 is constantly lit, to alert the user of the malfunction of the ground fault circuit interrupter. It should be understood that, in this embodiment, if the ground fault detection module 3 functions normally, the light emitting diode LED2 will only blink.

Similarly, in FIG. 3, if the light emitting diode LED2 does not exist, when one of the SCRs (Q1 or Q4) and/or one of the tripping coils (SOL1 or SOL2) of the tripping module malfunctions, the device can still operate normally.

Figure 4:
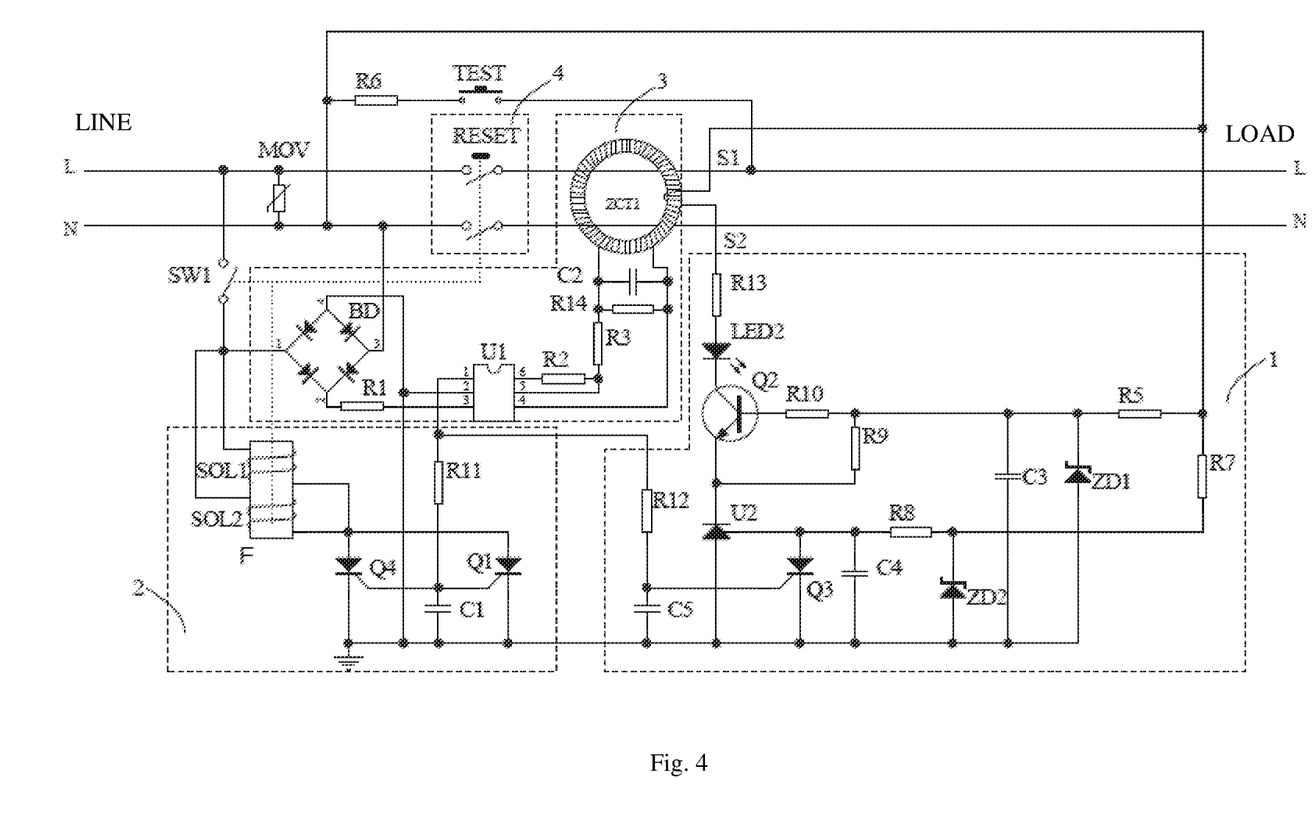
FIG. 4 is a circuit diagram showing a fourth embodiment of the present invention.

FIG. 4 is a circuit diagram showing a ground fault circuit interrupter according to the fourth embodiment of the present invention. The self-testing module 1 of FIG. 4 operates in the same way as that of FIG. 3, and the tripping module 2 of FIG. 4 operates in the same way as that of FIG. 2. The detailed descriptions are omitted here.

Figure 5:
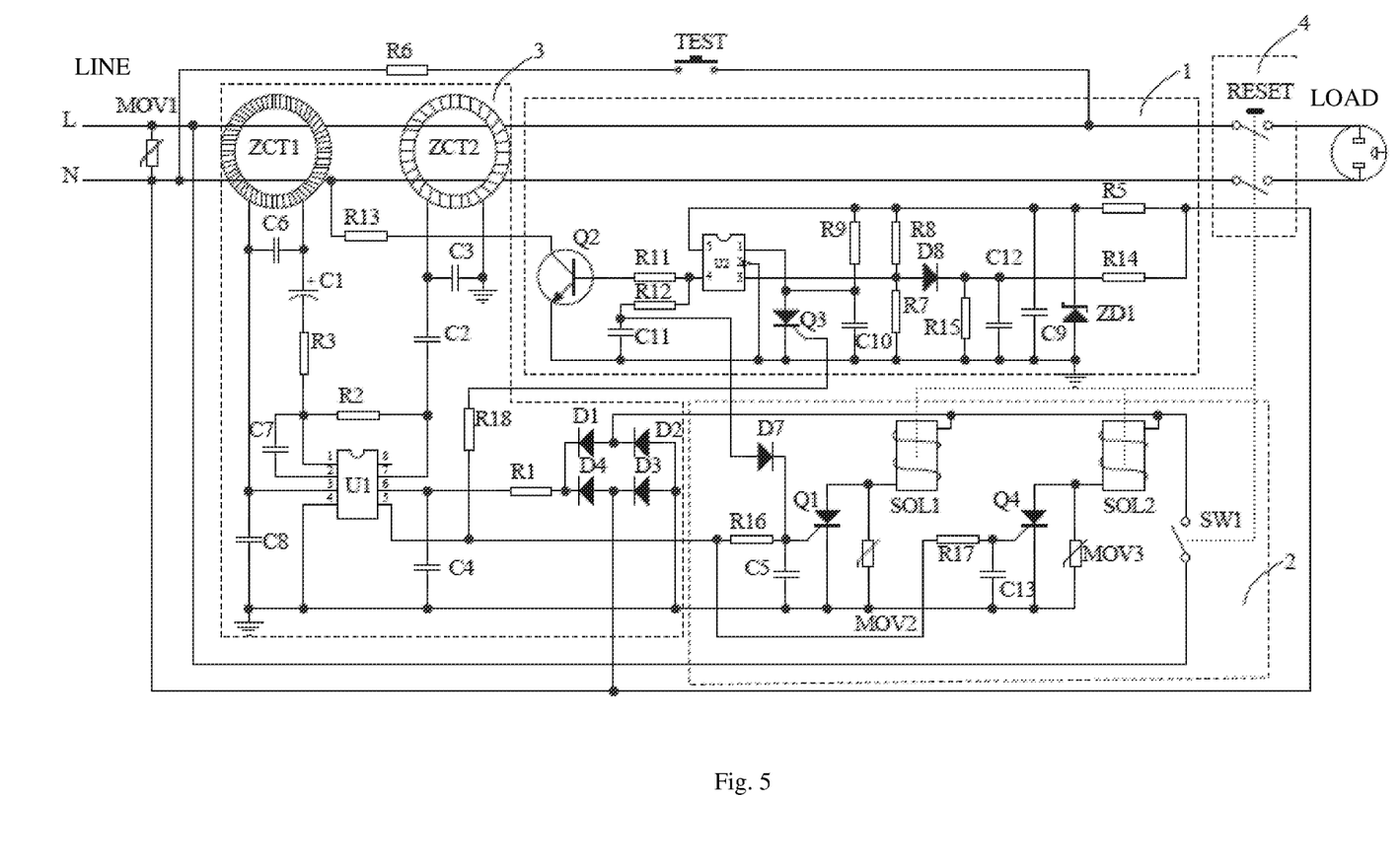
FIG. 5 is a circuit diagram showing a fifth embodiment of the present invention.

FIG. 5 is a circuit diagram showing a ground fault circuit interrupter according to the fifth embodiment of the present invention.

Referring to FIG. 5, a difference between this circuit and that of FIG. 1 is that, here the ground fault detection module 3 includes a leakage current detection ring ZCT1, a neutral line detection ring ZCT2, a leakage current detection module (including leakage current detection chip U1, resistors R3 and R2 and other related electronic components), and a rectifier diode bridge D1-D4. The leakage current detection ring ZCT1 detects whether a ground fault exists between the phase line L and neutral line N, and the neutral line detection ring ZCT2 detects whether a ground fault exists between the neutral line N and the ground line. The rectifier bridge D1-D4 is coupled to the phase line and the neutral line, and is coupled via resistor R1 to the leakage current detection chip U1 (pin 6 of U1), to supply working power to the leakage current detection chip U1. The leakage current detection chip U1 is respectively coupled to the leakage current detection ring ZCT1 and the neutral line detection ring ZCT2, to detect the two types of ground fault (and to output a detection signal at pin 5 of U1).

The self-testing module 1 of FIG. 5 operates in the same way as that of FIG. 1, and the tripping module 2 of FIG. 5 operates in the same way as that of FIG. 1. The detailed descriptions are omitted here.

Figure 6:
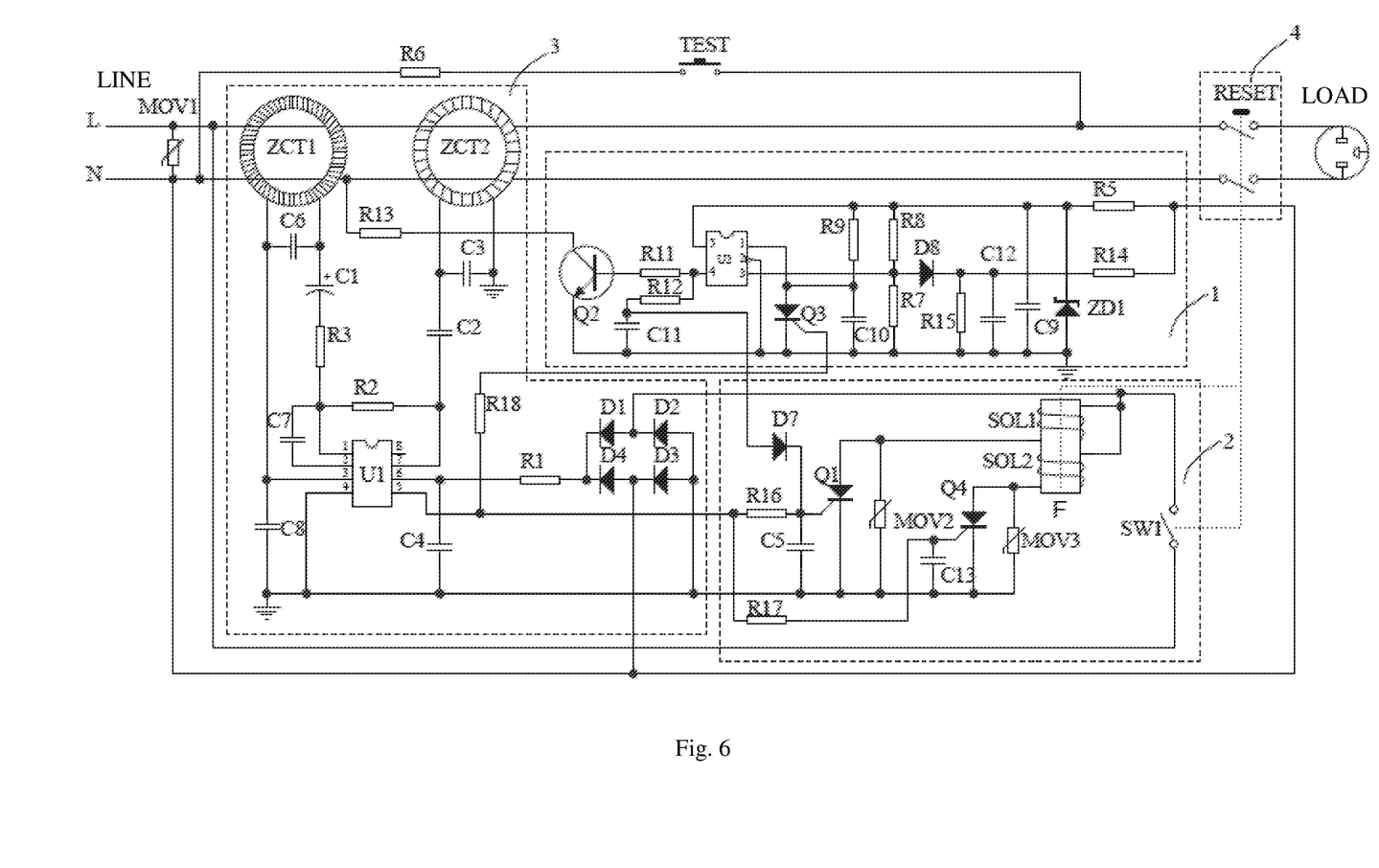
FIG. 6 is a circuit diagram showing a sixth embodiment of the present invention.

FIG. 6 is a circuit diagram showing a ground fault circuit interrupter according to the sixth embodiment of the present invention. In the sixth embodiment, the ground fault detection module 3 operates in the same way as that of FIG. 5, the self-testing module 1 operates in the same way as that of FIG. 1, and the tripping module 2 operates in the same way as that of FIG. 2. Compared to the embodiments of FIGS. 1-5, the sixth embodiment can both detect the ground fault between the phase line and the neutral line and between the neutral line and the ground line, and allow some tripping drive components to function normally when one or more other tripping drive components of the tripping module 2 malfunctions. Therefore, the ground fault circuit interrupter of the sixth embodiment is more reliable and safer.

In summary, the ground fault circuit interrupter according to embodiments of this invention has a self-testing function, and at the same time, when one or more of its tripping drive components malfunctions due to long term use, the ground fault circuit interrupter as a whole can still function normally. Also, during self-testing, the ground fault circuit interrupter can use indicator light, automatic disconnect, etc. methods to alert the user that the device should not be used any more. This makes it convenient for the different user groups to use the ground fault circuit interrupter safely and reliably, in particular users who cannot recognize a malfunction in the device based on the indicator lights. This ultimately leads to safe use of electrical appliances.

It will be apparent to those skilled in the art that various modification and variations can be made in the ground fault circuit interrupter device of the present invention without departing from the spirit or scope of the invention. Thus, it is intended that the present invention cover modifications and variations that come within the scope of the appended claims and their equivalents.

What is claimed is:

1. A ground fault circuit interrupter comprising:
    a switch module, coupled between an input end and an output end to control electrical connection between the input end and the output end;
    a ground fault detection module, for detecting whether a leakage current signal exists at the output end; and
    a tripping module, coupled to the ground fault detection module and the switch module, configured to control the switch module to electrically disconnect the output end from the input end based on the leakage current signal detected by the ground fault detection module,
    wherein the tripping module includes at least two tripping drive components connected in parallel, each tripping drive component including a semiconductor device coupled to the ground fault detection module and a tripping coil coupled to the semiconductor device, and
    wherein when the ground fault detection module detects the leakage current signal, the ground fault detection module causes the semiconductor device of at least one of the tripping drive components to become conductive to control the corresponding tripping coil, wherein the tripping coil in turn drives the switch module to electrically disconnect the output end from the input end.

2. The ground fault circuit interrupter of claim 1, further comprising:
    a self-testing module, coupled to the ground fault detection module and periodically generating a self-test pulse signal which simulates the leakage current signal.

3. The ground fault circuit interrupter of claim 1, wherein each semiconductor device includes any one of a silicon controlled rectifier, a MOSFET (metal oxide semiconductor field effect transistors), and a transistor.

4. The ground fault circuit interrupter of claim 1, wherein the ground fault detection module includes:

a leakage current detection ring for detecting whether a leakage current signal exists between a phase line and a neutral line at the output end; and a leakage current detection unit coupled to the leakage current detection ring and to the tripping module, wherein when the leakage current detection unit detects a leakage current signal via the leakage current detection ring, it controls the tripping module to drive the switch module to electrically disconnect the output end from the input end.

5. A ground fault circuit interrupter comprising:

a switch module, coupled between an input end and an output end to control electrical connection between the input end and the output end;

a ground fault detection module, for detecting whether a leakage current signal exists at the output end;

a self-testing module, coupled to the ground fault detection module and periodically generating a self-test pulse signal which simulates the leakage current signal; and a tripping module, coupled to the ground fault detection module and the switch module, wherein the tripping module includes at least two tripping drive components, each tripping drive component being configured to control the switch module to electrically disconnect the output end from the input end based on the leakage current signal detected by the ground fault detection module;

wherein the ground fault detection module includes a periodic timing circuit and a self-test pulse signal circuit coupled to each other, wherein the periodic timing circuit controls a timing interval of generation of the self-test pulse signal by the self-test pulse signal circuit.

6. The ground fault circuit interrupter of claim 5, wherein the self-test pulse signal circuit includes a switch device and a shunt reference coupled to the switch device, wherein the periodic timing circuit is coupled to the shunt reference to control the switch device to generate the self-test pulse signal.

7. The ground fault circuit interrupter of claim 5, wherein the self-test pulse signal circuit includes a switch device and a comparator coupled to the switch device, wherein the periodic timing circuit is coupled to the comparator to control the switch device to generate the self-test pulse signal.

8. The ground fault circuit interrupter of claim 5, wherein the ground fault detection module further includes a power supply module for supplying power to the self-test pulse signal circuit and/or the periodic timing circuit.

9. The ground fault circuit interrupter of claim 5, wherein the ground fault detection module further includes a power supply module for supplying power to the self-test pulse signal circuit, and a pulse source for periodic timing which is coupled to a power line of the ground fault circuit interrupter to obtain power to supply power to the periodic timing circuit.

10. The ground fault circuit interrupter of claim 5, wherein the ground fault detection module includes:

a leakage current detection ring for detecting whether a leakage current signal exists between a phase line and a neutral line at the output end; and a leakage current detection unit coupled to the leakage current detection ring and to the tripping module, wherein when the leakage current detection unit detects a leakage current signal via the leakage current detection ring, it controls the tripping module to drive the switch module to electrically disconnect the output end from the input end.

11. A ground fault circuit interrupter comprising:

a switch module, coupled between an input end and an output end to control electrical connection between the input end and the output end;

a ground fault detection module, for detecting whether a leakage current signal exists at the output end; and a tripping module, coupled to the ground fault detection module and the switch module, configured to control the switch module to electrically disconnect the output end from the input end based on the leakage current signal detected by the ground fault detection module, wherein the tripping module includes:

a tripping mechanism mechanically coupled to the switch module;

two tripping coils disposed on the tripping mechanism and connected in parallel; and at least two semiconductor devices, each coupled to the two tripping coils, each semiconductor device further coupled to the ground fault detection module, wherein each semiconductor device and each tripping coil form a tripping drive component, wherein when the ground fault detection module detects the leakage current signal, the ground fault detection module causes at least one of the semiconductor devices to become conductive to drive the switch module to electrically disconnect the output end from the input end.

12. The ground fault circuit interrupter of claim 11, wherein each semiconductor device includes any one of a silicon controlled rectifier, a MOSFET (metal oxide semiconductor field effect transistors), and a transistor.

13. The ground fault circuit interrupter of claim 11, further comprising:

a self-testing module, coupled to the ground fault detection module and periodically generating a self-test pulse signal which simulates the leakage current signal.

14. The ground fault circuit interrupter of claim 11, wherein the ground fault detection module includes:

a leakage current detection ring for detecting whether a leakage current signal exists between a phase line and a neutral line at the output end; and a leakage current detection unit coupled to the leakage current detection ring and to the tripping module, wherein when the leakage current detection unit detects a leakage current signal via the leakage current detection ring, it controls the tripping module to drive the switch module to electrically disconnect the output end from the input end.

* * * * *